(No Model.)
I. S. HYATT.
METHOD OF PURIFYING WATER.
No. 293,740. Patented Feb. 19, 1884.
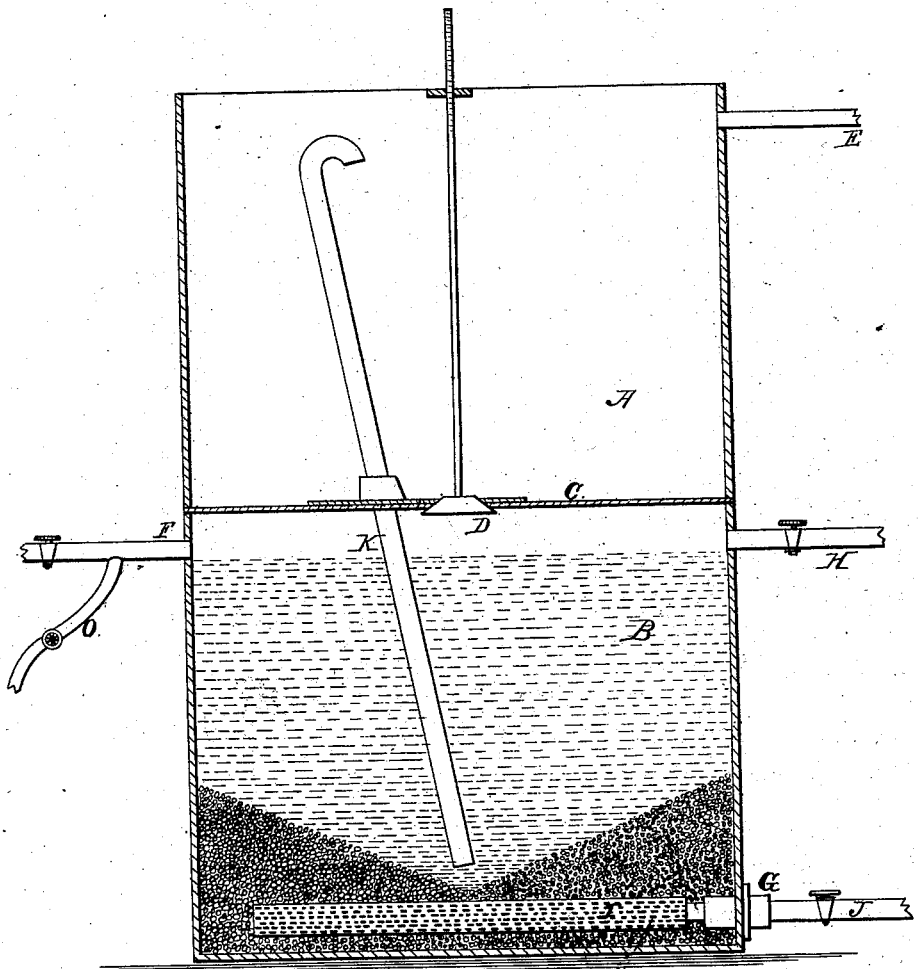
WITNESSES:
Herman Gustow
William R. Eerison
INVENTOR
Isaiah Smith Hyatt,
BY Chas. O. Gill
ATTORNEY

UNITED STATES PATENT OFFICE.

ISAIAH SMITH HYATT, OF MORRISTOWN, NEW JERSEY.

METHOD OF PURIFYING WATER.

SPECIFICATION forming part of Letters Patent No. 293,740, dated February 19, 1884.

Application filed September 20, 1883. (No model.)

*To all whom it may concern:*

Be it known that I, ISAIAH SMITH HYATT, a citizen of the United States, and a resident of Morristown, in the county of Morris and State of New Jersey, have invented certain new and useful Improvements in the Art of Filtration, of which the following is a specification.

The invention relates to improvements in the art of filtration; and it consists in the method hereinafter described of arresting and removing the particles of foreign matter liable to pass through the filter-bed with the escaping water during an uninterrupted process of filtration, or one in which a stream of water is passed through a bed of filtering material contained in a filter, the filter being a receptacle containing a bed of filtering material, and having a supply-pipe for the introduction of the water and a pipe for its passage therefrom, the said supply-pipe having another pipe, through which I introduce into the water, simultaneously with its passage into the filter, a substance—such as perchloride or persulphate of iron—for the purpose of sufficiently coagulating the impurities in the water to admit of their arrest by the bed during the passage of the water through the filter.

In practicing the invention some form of mechanical apparatus must be employed; and, while I do not confine myself to any particular construction, I recommend the apparatus described and claimed in Letters Patent of the United States No. 273,542, granted to John W. Hyatt on the 6th day of March, 1883, which I have used with very satisfactory results.

In the accompanying drawing I have illustrated a sectional view of such an apparatus by means of which the invention sought to be protected hereby may be successfully practiced; but, as I have stated, other forms of filtering apparatus may be used with good results.

The apparatus shown in the drawing consists of the upper and lower compartments, A B, separated by a diaphragm, C, in which is provided the valve D. The upper compartment is provided with a waste-outlet, E, and the lower compartment with a supply-pipe, F, a delivery, G, and a waste-pipe, H. The delivery consists of a tube of perforated metal, I, connecting with the pipe J. A transfer washing-pipe, K, will extend from the lower part of the compartment B to a suitable point adjacent to the upper part of the compartment A. The bed of sand or other suitable filtering agent will be placed in the lower compartment. The passage of the liquid through the apparatus above described and the method of washing the filter-bed will be the same as that set forth in said Letters Patent. The supply-pipe F has connected with it a pipe, O, which will pass from any suitable supply of persulphate of iron or perchloride of iron or other coagulating agent, which, by preference, will be in solution. The filter-bed and the persulphate or perchloride of iron or other coagulating agent will meet at the juncture of the pipes F and O, and then pass into the filter together, with the result that the minute particles of foreign matter in the liquid will be sufficiently coagulated to permit their arrestation by the filtering agent.

As I have stated, the proportions or quantities of the coagulating agent cannot be accurately defined. It is only necessary that a sufficient quantity be used to effect that degree of coagulation which will admit of the fine impurities being arrested from the water on its passage through the filter-bed during a continuous process. It will be understood that in this process the coarse impurities present in the water may be arrested by the filter-bed without coagulation. I may mention, as an illustration, that I have successfully purified the water of the Mississippi river at New Orleans by using about one-eighth of a pound of perchloride of iron of from 50° to 60° Baumé to a thousand gallons of water.

I do not confine myself to the employment of persulphate or perchloride of iron or permanganate of potassa, but make use of any other suitable agent which is capable of coagulating the impurities of the liquid and preventing their passage through the filter-bed. Neither do I limit myself to any particular proportions or quantities of the coagulating agent, as they may be varied according to circumstances and the character of the liquid to be treated. Nor do I confine myself to any particular liquid, although I contemplate chiefly the purification of water in large quantities.

It is obvious that by the use of the uninterrupted process hereinbefore described I entirely dispense with the employment of settling basins or reservoirs as now commonly employed.

What I claim as my invention, and desire to secure by Letters Patent, is—

The method hereinbefore described of arresting and removing the impurities from water during an uninterrupted passage of same from a supply-pipe into a filtering apparatus, thence through a filter-bed contained therein, and out through a delivery-pipe leading therefrom, which method consists in introducing into the water simultaneously with its passage to or into the filter a substance which will sufficiently coagulate or separate the impurities to facilitate their arrest and removal by the filter-bed, thus obviating the necessity of employing settling-basins.

Signed at New York, in the county of New York and State of New York, this 15th day of September, A. D. 1883.

ISAIAH SMITH HYATT.

Witnesses:
   CHAS. C. GILL,
   HERMAN GUSTOW.

293,740.—*Isaiah Smith Hyatt*, Morristown, N. J. IMPROVEMENT IN METHODS OF PURI-
FYING WATER. Patent dated February 19, 1884. Disclaimer filed July 27, 1889,
by the present assignee, *The Hyatt Pure Water Company*, Newark, N. J.

Enters its disclaimer to the paragraph in the specification which is in the following words, to wit:

"I do not confine myself to the employment of persulphate or perchloride of iron or permanganate of potassa, but make use of any other suitable agent which is capable of coagulating the impurities of the liquid and preventing their passage through the filter-bed. Neither do I limit myself to any particular proportions or quantities of the coagulating agent, as they may be varied according to circumstances and the character of the liquid to be treated. Nor do I confine myself to any particular liquid, although I contemplate chiefly the purification of water in large quantities."—[*Official Gazette, August 6, 1889.*]